US010527276B2

(12) United States Patent
Dunn et al.

(10) Patent No.: US 10,527,276 B2
(45) Date of Patent: Jan. 7, 2020

(54) ROD AS A LENS ELEMENT FOR LIGHT EMITTING DIODES

(71) Applicant: Manufacturing Resources International, Inc., Alpharetta, GA (US)

(72) Inventors: William Dunn, Alpharetta, GA (US); Harry Presley, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 167 days.

(21) Appl. No.: 14/689,939

(22) Filed: Apr. 17, 2015

(65) Prior Publication Data

US 2015/0300628 A1 Oct. 22, 2015

Related U.S. Application Data

(60) Provisional application No. 61/980,876, filed on Apr. 17, 2014.

(51) Int. Cl.
*A47F 3/00* (2006.01)
*F21V 5/04* (2006.01)
(Continued)

(52) U.S. Cl.
CPC .......... *F21V 33/0012* (2013.01); *A47F 3/001* (2013.01); *A47F 11/10* (2013.01);
(Continued)

(58) Field of Classification Search
CPC ...... F21V 33/0012; F21V 5/043; A47F 3/001; A47F 2003/008; A47F 11/10;
(Continued)

(56) References Cited

U.S. PATENT DOCUMENTS

| 1,812,919 A | 7/1931 | Balder |
| 3,510,973 A | 5/1970 | Mazzocco, Sr. |

(Continued)

FOREIGN PATENT DOCUMENTS

| AU | 2004283319 A1 | 5/2005 |
| AU | 2007216782 A1 | 9/2007 |

(Continued)

OTHER PUBLICATIONS

GRINTECH, Grin Lenses, webpages at http://www.grintech.de/grin-lenses.html, Aug. 25, 2016 (accessed on or before Apr. 16, 2014), 4 pages, GRINTECH GmbH, Germany.

(Continued)

*Primary Examiner* — Erin Kryukova
(74) *Attorney, Agent, or Firm* — Standley Law Group LLP; Jeffrey S. Standley; Eric M. Gayan

(57) ABSTRACT

The exemplary embodiments herein provide a lighting system for a display case having at least one edge. A lighting assembly is positioned along an edge of the display case or a door assembly, where a transparent or semi-transparent rod is positioned adjacent to the lighting assembly to act as a lens element. The rod is generally placed parallel to the edge of the display case or door assembly. The lighting assembly preferably includes a mounting structure which contains a substrate with a plurality of LEDs along with the rod. A blinder may extend rearwardly from the mounting structure to prevent headlighting.

11 Claims, 5 Drawing Sheets

(51) Int. Cl.
*F21V 33/00* (2006.01)
*F21Y 103/10* (2016.01)
*F21Y 115/10* (2016.01)
*G02F 1/13357* (2006.01)
*A47F 11/10* (2006.01)
*G09F 23/06* (2006.01)

(52) U.S. Cl.
CPC ...... *G09F 23/065* (2013.01); *A47F 2003/008* (2013.01); *F21V 5/043* (2013.01); *F21Y 2103/10* (2016.08); *F21Y 2115/10* (2016.08); *G02F 1/1336* (2013.01)

(58) Field of Classification Search
CPC .......... A47F 3/005; A47F 3/007; A47F 3/008; G02F 1/1336; G02F 1/133615; G02F 1/133603; G02F 2001/133606; G02F 2001/133607; G02F 1/133602; G02F 1/133606; F21Y 2103/10; F21Y 2115/10; G02B 6/001; G09F 23/065; G09F 23/0058; G09F 23/04
USPC .................................................. 362/125, 133
See application file for complete search history.

(56) References Cited

U.S. PATENT DOCUMENTS

| | | | |
|---|---|---|---|
| 4,257,084 A | 3/1981 | Reynolds | |
| 4,804,953 A | 2/1989 | Castleberry | |
| 5,040,878 A * | 8/1991 | Eichenlaub | F21V 5/00 348/E13.027 |
| 5,046,805 A | 9/1991 | Simon | |
| 5,066,106 A | 11/1991 | Sakamoto et al. | |
| 5,363,149 A | 11/1994 | Furuno et al. | |
| 5,440,324 A | 8/1995 | Strickling, III et al. | |
| 5,453,855 A | 9/1995 | Nakamura et al. | |
| 5,528,720 A | 6/1996 | Winston et al. | |
| 5,598,068 A | 1/1997 | Shirai | |
| 5,661,578 A | 8/1997 | Habing et al. | |
| 5,856,854 A | 1/1999 | Hyun | |
| 6,027,222 A | 2/2000 | Oki et al. | |
| 6,166,389 A | 12/2000 | Shie et al. | |
| 6,307,216 B1 | 10/2001 | Huh et al. | |
| 6,400,101 B1 | 6/2002 | Biebl et al. | |
| 6,409,356 B1 * | 6/2002 | Nishimura | G02F 1/133615 362/223 |
| 6,419,372 B1 | 7/2002 | Shaw et al. | |
| 6,421,103 B2 | 7/2002 | Yamaguchi | |
| 6,481,130 B1 | 11/2002 | Wu | |
| 6,601,984 B2 | 8/2003 | Yamamoto et al. | |
| 6,636,003 B2 | 10/2003 | Rahm et al. | |
| 6,762,815 B2 | 7/2004 | Lee | |
| 6,789,921 B1 | 9/2004 | Deloy et al. | |
| 6,805,468 B2 | 10/2004 | Itoh et al. | |
| 6,842,204 B1 | 1/2005 | Johnson | |
| 6,860,628 B2 | 3/2005 | Robertson et al. | |
| 6,936,968 B2 | 8/2005 | Cross et al. | |
| 6,949,772 B2 | 9/2005 | Shimizu et al. | |
| 6,958,743 B2 | 10/2005 | Shin et al. | |
| 7,012,379 B1 | 3/2006 | Chambers et al. | |
| 7,015,650 B2 | 3/2006 | McGrath | |
| 7,018,054 B2 | 3/2006 | Miyashita et al. | |
| 7,025,474 B2 | 4/2006 | Campbell et al. | |
| 7,038,186 B2 | 5/2006 | De Brabander et al. | |
| 7,040,794 B2 | 5/2006 | Bernard | |
| 7,045,828 B2 | 5/2006 | Shimizu et al. | |
| 7,049,761 B2 | 5/2006 | Timmermans et al. | |
| 7,053,557 B2 | 5/2006 | Cross et al. | |
| 7,057,590 B2 | 6/2006 | Lim et al. | |
| 7,218,812 B2 | 5/2007 | Maxwell et al. | |
| 7,250,637 B2 | 7/2007 | Shimizu et al. | |
| 7,259,403 B2 | 8/2007 | Shimizu et al. | |
| 7,307,391 B2 | 12/2007 | Shan | |
| 7,307,614 B2 | 12/2007 | Vinn | |
| 7,347,706 B1 | 3/2008 | Wu et al. | |
| 7,352,940 B2 | 4/2008 | Charters et al. | |
| 7,375,381 B2 | 5/2008 | Shimizu et al. | |
| 7,421,167 B2 | 9/2008 | Charters et al. | |
| 7,473,019 B2 | 1/2009 | Laski | |
| 7,481,553 B2 | 1/2009 | Kim et al. | |
| 7,481,566 B2 | 1/2009 | Han | |
| 7,510,299 B2 | 3/2009 | Timmermans et al. | |
| 7,513,637 B2 | 4/2009 | Kelly et al. | |
| 7,546,009 B2 | 6/2009 | Kukulj et al. | |
| 7,738,746 B2 | 6/2010 | Charters et al. | |
| 7,781,979 B2 | 8/2010 | Lys | |
| 7,795,574 B2 | 9/2010 | Kennedy et al. | |
| 7,813,694 B2 | 10/2010 | Fishman et al. | |
| 7,982,706 B2 | 7/2011 | Ichikawa et al. | |
| 8,021,900 B2 | 9/2011 | Maxwell et al. | |
| 8,064,744 B2 | 11/2011 | Atkins et al. | |
| 8,120,595 B2 | 2/2012 | Kukulj et al. | |
| 8,194,031 B2 | 6/2012 | Yao et al. | |
| 8,274,626 B2 | 9/2012 | Choi et al. | |
| 8,294,168 B2 | 10/2012 | Park et al. | |
| 8,351,013 B2 | 1/2013 | Dunn et al. | |
| 8,400,430 B2 | 3/2013 | Dunn et al. | |
| 8,529,993 B2 | 9/2013 | Charters et al. | |
| 8,648,993 B2 | 2/2014 | Dunn et al. | |
| 8,674,390 B2 | 3/2014 | Harris et al. | |
| 8,674,963 B2 | 3/2014 | Cornish et al. | |
| 8,803,790 B2 | 8/2014 | Wasinger et al. | |
| 8,842,366 B2 | 9/2014 | Arnett et al. | |
| 9,348,174 B2 | 5/2016 | Dunn et al. | |
| 9,881,528 B2 | 1/2018 | Dunn | |
| 2001/0009508 A1 | 7/2001 | Umemoto et al. | |
| 2001/0033726 A1 | 10/2001 | Shie et al. | |
| 2002/0043012 A1 | 4/2002 | Shibata et al. | |
| 2002/0126078 A1 | 9/2002 | Horibe et al. | |
| 2003/0026085 A1 | 2/2003 | Ueda et al. | |
| 2003/0227428 A1 | 12/2003 | Nose | |
| 2004/0062029 A1 | 4/2004 | Ato | |
| 2004/0113044 A1 | 6/2004 | Ishiguchi | |
| 2005/0094391 A1 | 5/2005 | Campbell et al. | |
| 2005/0105303 A1 * | 5/2005 | Emde | B32B 17/10045 362/616 |
| 2005/0117323 A1 | 6/2005 | King | |
| 2005/0140848 A1 | 6/2005 | Yoo et al. | |
| 2005/0162737 A1 | 7/2005 | Whitehead et al. | |
| 2005/0265019 A1 | 12/2005 | Sommers et al. | |
| 2006/0012985 A1 | 1/2006 | Archie, Jr. et al. | |
| 2006/0055012 A1 | 3/2006 | Hsin Chen et al. | |
| 2006/0077686 A1 * | 4/2006 | Han | G02B 6/0028 362/610 |
| 2006/0082700 A1 | 4/2006 | Gehlsen et al. | |
| 2006/0087521 A1 | 4/2006 | Chu et al. | |
| 2006/0092346 A1 | 5/2006 | Moon et al. | |
| 2006/0092348 A1 | 5/2006 | Park | |
| 2006/0125418 A1 | 6/2006 | Bourgault | |
| 2006/0197474 A1 | 9/2006 | Olsen | |
| 2006/0221612 A1 | 10/2006 | Song et al. | |
| 2006/0238367 A1 | 10/2006 | Tsuchiya | |
| 2006/0262079 A1 | 11/2006 | Seong et al. | |
| 2006/0279946 A1 | 12/2006 | Park et al. | |
| 2006/0289201 A1 | 12/2006 | Kim et al. | |
| 2007/0013828 A1 | 1/2007 | Cho et al. | |
| 2007/0021217 A1 | 1/2007 | Wu | |
| 2007/0070615 A1 | 3/2007 | Joslin et al. | |
| 2007/0097321 A1 | 5/2007 | Whitehead et al. | |
| 2007/0115686 A1 | 5/2007 | Tyberghien | |
| 2007/0139574 A1 | 6/2007 | Ko et al. | |
| 2007/0139929 A1 | 6/2007 | Yoo et al. | |
| 2007/0147037 A1 | 6/2007 | Wang | |
| 2007/0153515 A1 | 7/2007 | Hong et al. | |
| 2007/0171353 A1 | 7/2007 | Hong | |
| 2007/0171623 A1 | 7/2007 | Zagar et al. | |
| 2007/0195535 A1 | 8/2007 | Artwohl et al. | |
| 2007/0206158 A1 | 9/2007 | Kinoshita et al. | |
| 2007/0230218 A1 | 10/2007 | Jachim et al. | |
| 2007/0268234 A1 | 11/2007 | Wakabayashi et al. | |
| 2007/0297163 A1 | 12/2007 | Kim et al. | |
| 2008/0036940 A1 | 2/2008 | Song et al. | |
| 2008/0043463 A1 | 2/2008 | Park et al. | |

(56) References Cited

U.S. PATENT DOCUMENTS

| | | |
|---|---|---|
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0165526 A1 | 7/2008 | Saraiji et al. |
| 2008/0170178 A1 | 7/2008 | Kubota et al. |
| 2008/0170400 A1 | 7/2008 | Maruyama |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0033612 A1 | 2/2009 | Roberts et al. |
| 2009/0058795 A1 | 3/2009 | Yamazaki |
| 2009/0085859 A1 | 4/2009 | Song |
| 2009/0091634 A1 | 4/2009 | Kennedy et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0213579 A1 | 8/2009 | Saraiji et al. |
| 2009/0243501 A1 | 10/2009 | Dunn et al. |
| 2009/0244884 A1 | 10/2009 | Trulaske, Sr. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0307800 A1 | 12/2010 | Wee et al. |
| 2010/0313592 A1* | 12/2010 | Pae ............... F25D 23/02 62/264 |
| 2011/0007228 A1 | 1/2011 | Yoon et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1* | 6/2011 | Erion ............... F21V 23/009 362/218 |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2012/0050958 A1 | 3/2012 | Sanford et al. |
| 2012/0062819 A1 | 3/2012 | Dunn et al. |
| 2012/0098794 A1 | 4/2012 | Kleinert et al. |
| 2012/0105424 A1 | 5/2012 | Lee et al. |
| 2012/0134139 A1 | 5/2012 | Jang et al. |
| 2012/0242926 A1 | 9/2012 | Hsu et al. |
| 2012/0250329 A1 | 10/2012 | Suehiro et al. |
| 2012/0274882 A1 | 11/2012 | Jung |
| 2012/0314447 A1 | 12/2012 | Huang |
| 2012/0327039 A1 | 12/2012 | Kukulj |
| 2013/0016296 A1 | 1/2013 | Fujita et al. |
| 2013/0027633 A1 | 1/2013 | Park et al. |
| 2013/0063326 A1* | 3/2013 | Riegel ............... G09F 9/33 345/4 |
| 2013/0094160 A1 | 4/2013 | Narumi |
| 2013/0163277 A1 | 6/2013 | Kim et al. |
| 2013/0208447 A1* | 8/2013 | Maslen ............ A47F 3/0426 362/94 |
| 2013/0258659 A1* | 10/2013 | Erion ............... F21V 5/04 362/235 |
| 2013/0265525 A1* | 10/2013 | Dunn ............... F21V 29/025 349/65 |
| 2013/0278868 A1 | 10/2013 | Dunn et al. |
| 2014/0016355 A1 | 1/2014 | Ajichi |
| 2014/0078407 A1* | 3/2014 | Green ............... G09F 9/35 348/836 |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0144083 A1* | 5/2014 | Artwohl ............ A47F 3/0434 49/70 |
| 2014/0268657 A1 | 9/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0219954 A1 | 8/2015 | Kubo |
| 2015/0226996 A1 | 8/2015 | Ohashi |
| 2015/0346525 A1 | 12/2015 | Wolf et al. |
| 2016/0103275 A1 | 4/2016 | Diaz et al. |
| 2016/0238876 A1 | 8/2016 | Dunn et al. |
| 2017/0059938 A1 | 3/2017 | Brown et al. |
| 2017/0248823 A1 | 8/2017 | Dunn et al. |

FOREIGN PATENT DOCUMENTS

| | | |
|---|---|---|
| CA | 2536130 A1 | 5/2005 |
| CA | 2686214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| GB | 153110 | 11/1920 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2005228996 A | 8/2005 |
| JP | 2005236469 | 9/2005 |
| JP | 2005292939 A | 10/2005 |
| JP | 2008518251 A | 10/2005 |
| JP | 2005332253 A | 12/2005 |
| JP | 2006198344 A | 8/2006 |
| JP | 2007080872 A | 3/2007 |
| JP | 2009535723 A5 | 5/2007 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2011081424 A | 4/2011 |
| KR | 200286961 | 8/2002 |
| KR | 102007003755 A | 2/2006 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 1020050033986 A | 4/2014 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2006001559 A1 | 1/2006 |
| WO | WO2006109237 A1 | 10/2006 |
| WO | WO2007052777 A1 | 5/2007 |

(56) References Cited

FOREIGN PATENT DOCUMENTS

| WO | WO2005040873 A1 | 5/2008 |
|---|---|---|
| WO | WO2008138049 A | 11/2008 |
| WO | WO2009004574 A1 | 1/2009 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2014158642 A1 | 10/2014 |
| WO | WO2015003130 A1 | 1/2015 |

OTHER PUBLICATIONS

Wikipedia, Color rendering index, webpages at http://en.wikipedia.org/wiki/Color_rendering, Aug. 25, 2016 (accessed on or before Apr. 16, 2014), 13 pages, Wikipedia, the free encyclopedia.

Wikipedia, Gamut, webpages at http://en.wikipedia.org/wiki/Color_gamut, Aug. 25, 2016 (accessed on or before Apr. 16, 2014), 8 pages, Wikipedia, the free encyclopedia.

Wikipedia, Gradient-index optics, webpages at http://en.wikipedia.org/wiki/Gradient-index_optics, Aug. 25, 2016 (accessed on or before Apr. 16, 2014), 5 pages, Wikipedia, the free encyclopedia.

Wikipedia, Sol-gel, webpages at http://en.wikipedia.org/wiki/Sol-gel, Aug. 25, 2016 (accessed on or before Apr. 16, 2014), 12 pages, Wikipedia, the free encyclopedia.

Wikipedia, Gradient-index optics, 2016.

Patrick Frantz & Deania Fernandez, Printed Circuit Boards (PCBs), Feb. 18, 2004, 2 Pages, Version 1.1.

Teravision Corp., LCD-TV Panel Control Board Specification, Nov. 2007, 24 Pages.

Supertex Inc., Constant Off-time, Buck-based LED Drivers Using HV9910, Nov. 2, 2004, 4 Pages.

Grin Tech, Grin Lenses, Aug. 25, 2016, 4 Pages.

Supertex Inc., Universal High Brightness LED Driver, 2007, 8 Pages.

Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.

Panel-Brite, Inc., High Brightness LED Backlight Technology, Mar. 11, 2009, 1 Page.

RPO, How Digital Waveguide Touch Works, Sep. 15, 2011, 1 Page.

Dave Ross, How Transmissive Film Works, article, 2008, 9 pages.

Schott, Glass made of Ideas—OPALIKA, 2016, 2 pages.

\* cited by examiner

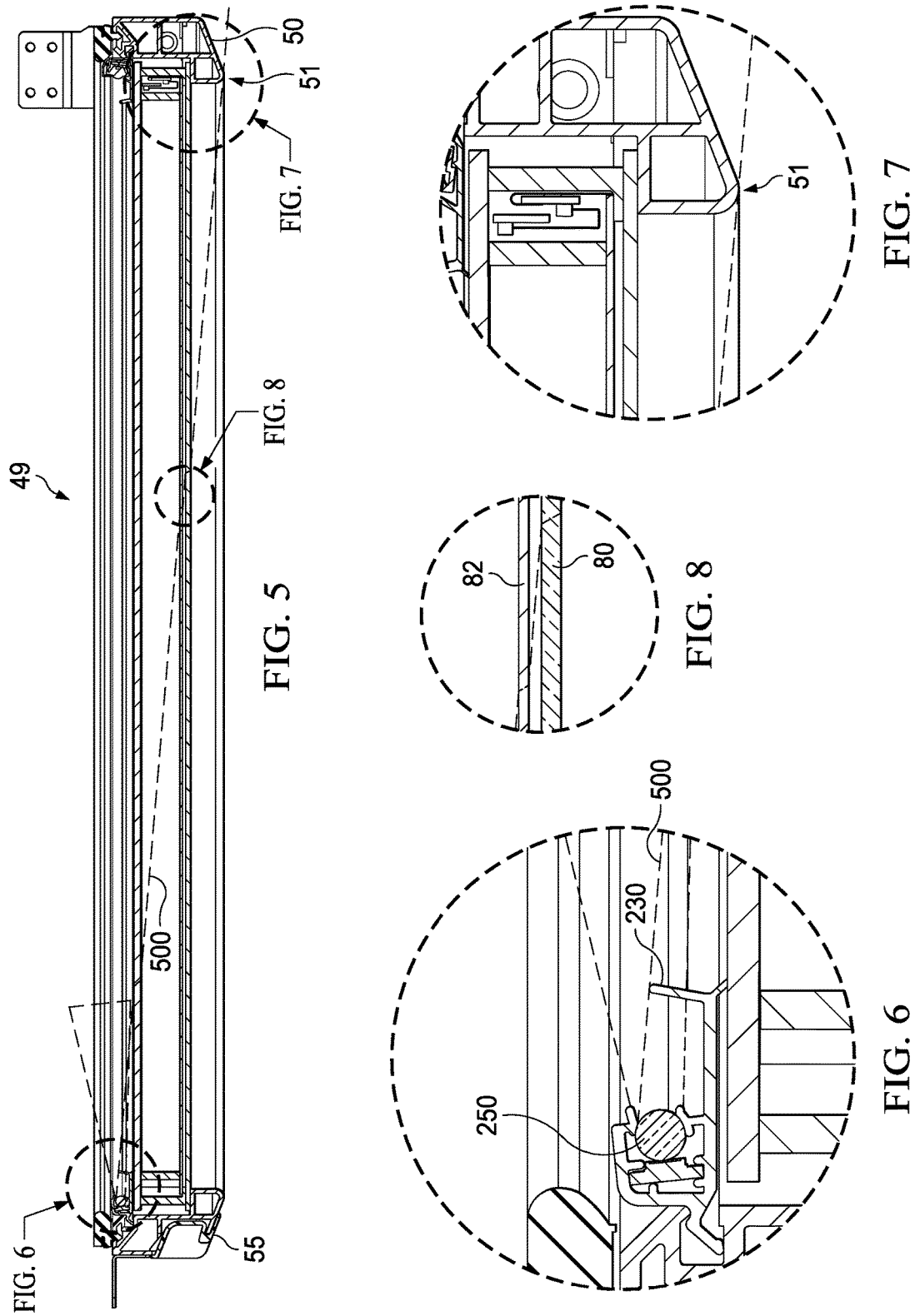

ROD AS A LENS ELEMENT FOR LIGHT EMITTING DIODES

CROSS-REFERENCE TO RELATED APPLICATIONS

This application claims priority to U.S. application Ser. No. 61/980,876 filed on Apr. 17, 2014 which is herein incorporated by reference in its entirety.

TECHNICAL FIELD

Embodiments generally relate to the use of a transparent or semi-transparent rod as a lens element for LEDs.

BACKGROUND OF THE ART

Display cases are used in a number of different retail establishments for illustrating the products that are available for sale. In some instances, these display cases may be coolers or freezers which are placed in grocery stores, convenience stores, gas stations, restaurants, or other retail establishments. In other instances, these display cases may be non-refrigerated transparent containers used in a jewelry or watch store, bakery, deli, antique shop, sporting goods store, electronics store, or other retail establishments. The lighting within these cases can be important to the way in which the product is presented to the consumer.

It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case. In this way, the lighting is further important to the impression of the consumer, not only for the appearance of the products on the shelves, but also for the appearance of the transparent LCD.

SUMMARY OF THE EXEMPLARY EMBODIMENTS

Exemplary embodiments utilize a plurality of LEDs positioned along one or more edges of a display case where a rod lens element is positioned along the plurality of LEDs.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 5 is a top planar section view taken along the section line A-A where only the door assembly is shown and Details A, B, and C are indicated.

FIG. 6 is a top planar section view of Detail A, indicated in FIG. 5.

FIG. 7 is a top planar section view of Detail B, indicated in FIG. 5.

FIG. 8 is a top planar section view of Detail C, indicated in FIG. 5.

DETAILED DESCRIPTION

Figure 1:
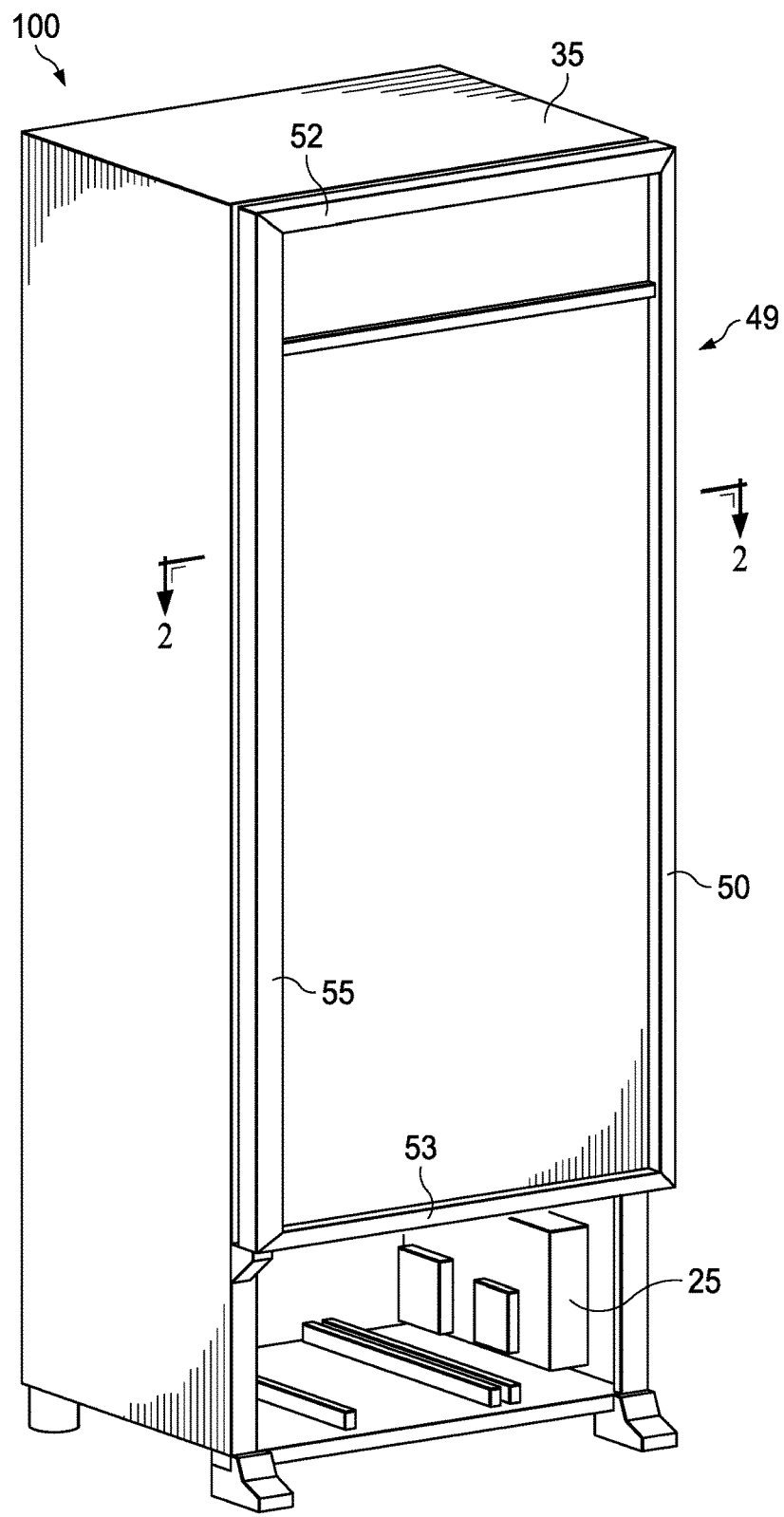
FIG. 1 is a front perspective view of an exemplary embodiment of the lighting system used within a display case and indicating the horizontal section line A-A.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a front perspective view of an exemplary embodiment of the lighting system used within a traditional display case 100 and indicating the horizontal section line 2-2. Typically, a display case 100 contains a five sided housing 35 with a door assembly 49 attached to enclose the products within the display case 100. Here, the door assembly 49 contains two opposing vertical edges 50 and 55 which contain the exemplary lighting assembly. However, it should be noted that lighting assemblies can also be placed along the two opposing horizontal edges 52 and 53. It is also possible to place the lighting assemblies only along the two edges 52 and 53. It is further possible to place the lighting assembly only along one of the edges 50, 52, 53, or 55. Generally, it has been found that exemplary embodiments would place the lighting assemblies along the longest of the two pairs of edges, which can vary depending upon the orientation of the front of the display case.

Of course, in this embodiment the front of the case 100 contains the door assembly 49, but in many other embodiments the case 100 simply contains a front glass assembly, without being an actual door that hinges to provide access to the interior of the case 100. The electronics 25 for driving the lighting assembly are shown within a bottom compartment of the display case 100, but the electronics could be placed anywhere, so long as they provide electrical communication to the lighting assemblies.

Figure 2:
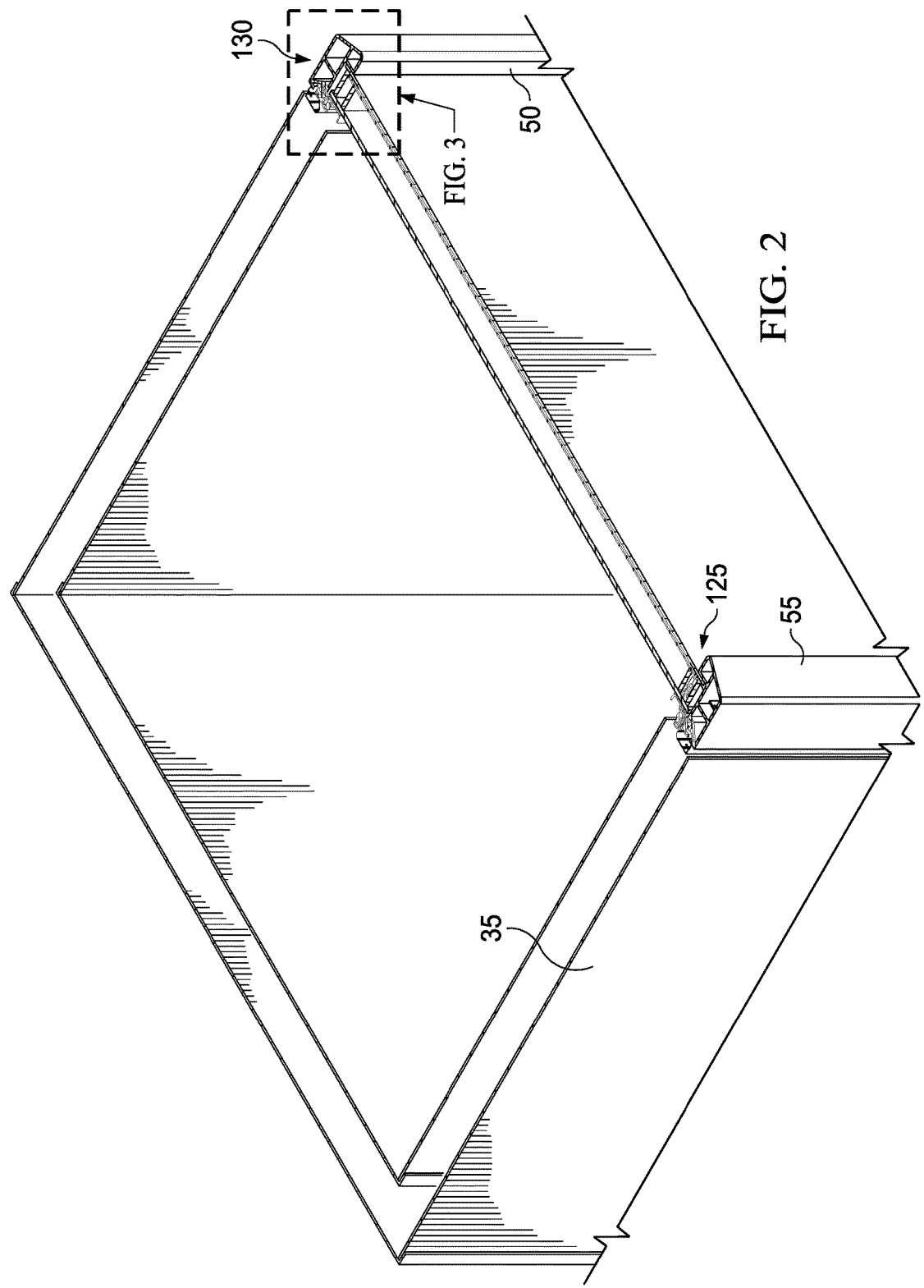
FIG. 2 is a top perspective section view taken along the section line A-A and indicating Detail 3.
Figure 3:
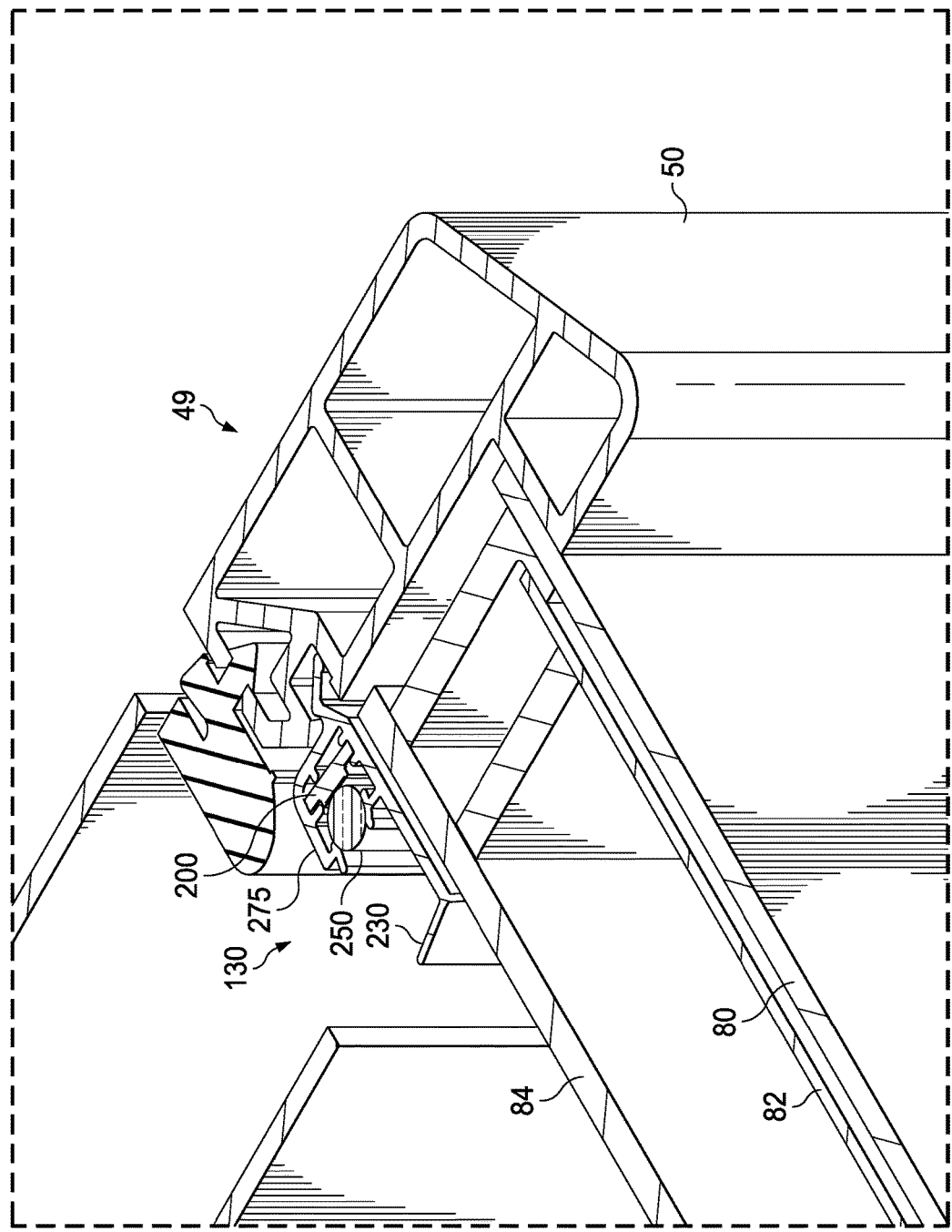
FIG. 3 is a detailed perspective section view of Detail 3 shown in FIG. 2.

FIG. 2 is a top perspective section view taken along the section line 2-2 and indicating an area of detail shown in enlarged form in FIG. 3. Here, a first lighting assembly 130 is shown positioned along the edge 50, while a second lighting assembly 125 is positioned along the edge 55.

FIG. 3 is an enlarged view of the area indicated as FIG. 3 in FIG. 2. The door assembly 49 contains a rear glass 84, liquid crystal layer 82, and a front glass 80 which are held between the two edges 50 and 55. The lighting assembly 130 is attached to a portion of the edge 50 which faces the interior of the display case 100. In this embodiment of the lighting assembly 130, a mounting structure 275 is attached to the edge 50 and contains both the LEDs 200 as well as the rod lens element 250. A blinder 230 preferably extends from the mounting structure 275 and prevents headlighting (a concept that will be discussed further below).

Figure 4:
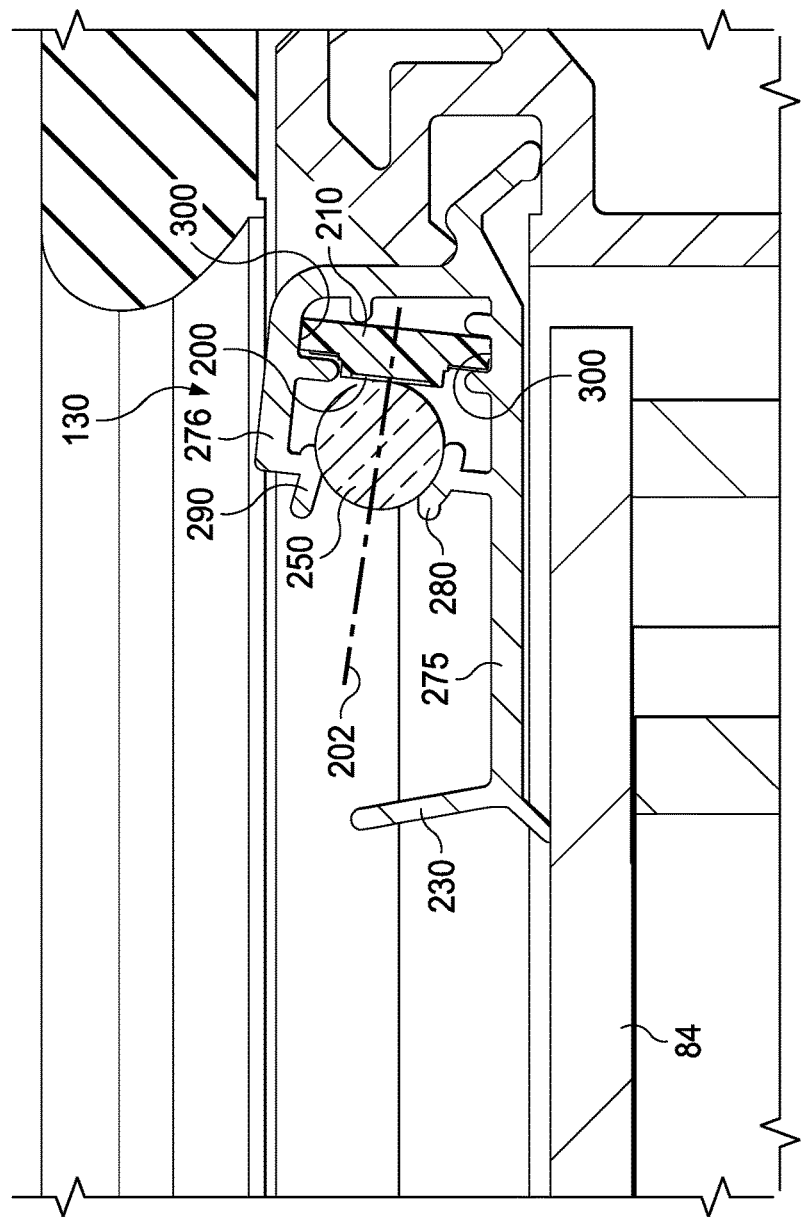
FIG. 4 is a top planar section view of Detail 3 shown in FIG. 2.

FIG. 4 is an enlarged top planar view of the area indicated as FIG. 3 in FIG. 2. Generally speaking, the mounting structure preferably contains an arm 276 which extends rearward to define a U-shaped channel to contain the rod lens element 250 and LEDs 200. The mounting structure 275 and its associated arm 276 preferably define a slot 300 which is sized to accept the PCB 210 containing the LEDs 200. A rod lens element 250 may then be sandwiched between a rear ledge 290, front ledge 280, and the LEDs 200. In an exemplary embodiment, the mounting structure 275 may be extruded or injection molded and the PCB 210 may slide into the end of the extruded or molded structure. The rod lens element 250 can then be snapped into place by forcing the rear ledge 290 away from the front ledge 280 enough to insert the rod lens element 250. The mounting structure 275 is preferably plastic and more preferably a PVC, but could also be an extruded metal such as aluminum. The rod lens element 250 is a transparent or semi-transparent material which could be acrylic or glass.

It is preferable that the diameter of the rod lens element 250 is slightly larger than the width of the LED 200. For example, if the LED chip is 5 mm×5 mm, it has been found that rod diameters equal to or larger than 5 mm are preferred. Specifically, it is preferable that the rod diameter is one millimeter larger than the LED chip, and is then centered over the LED chip. In a preferred embodiment, the LED chip is 5 mm×5 mm and the diameter of the rod lens element is 6 mm. As shown in the figures, the central axis of the rod (here going into/out of the page) runs parallel to the strip of LEDs 200.

Generally, the central axis 202 of the LED 200 should be approximately 4-8 degrees from parallel with the rear glass 84 (which should be substantially parallel to the LCD 82, and front glass 80). In an exemplary embodiment, the central axis 202 of the LED 200 should be approximately 5-7 degrees from parallel with the rear glass 84. Also preferably the blinder 230 will extend rearward to a point almost equal to the rear-most point of the LED 200. Generally speaking, the angle of the central axis 202 and the length of the blinder 230 should be tailored to prevent headlighting, which will be discussed further below.

FIG. 5 is a top view of only the sectioned door assembly 49 of FIG. 2, where areas of detail shown in enlarged form in FIGS. 6-8 are indicated. Here, the headlighting from the lighting assembly placed along the edge 55 is analyzed. Headlighting, as used in this application, is the phenomenon of direct paths of LED light passing through the rear glass, LCD, and front glass to impact the eye of an observer outside of the display case.

FIG. 6 is an enlarged top planar view of the area indicated as FIG. 6 in FIG. 5. In this figure, the line 500 represents the visual line starting from the most rearward point of the rod lens element 250, passing by the blinder 230, and refracting through the rear glass, LCD, and front glass. As noted above, the angle of the axis of the LED as well as the length of the blinder 230 should be selected so that line 500 would be approximately at the outside corner 51 of the door assembly 49 (or simply the front glass assembly if not using an opening/closing door) so that it would not be directly visible by an observer. Thus, even at the most extreme angles, light exiting the lens 250 would not be directly visible to an observer, as this light would be caught by the edge 50 with almost all of the light being directed back into the case 100, only to be reflected off the contents and back through the LCD and front glass.

FIG. 7 is an enlarged top planar view of the area indicated as FIG. 7 in FIG. 5.

FIG. 8 is an enlarged top planar view of the area indicated as FIG. 8 in FIG. 5.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A lighting system for a display case comprising:
   a door glass assembly having a front glass located to front the environment in which the display case will be situated, a rear glass located rearward of the front glass, and at least one edge;
   a lighting assembly placed along the at least one edge of the door glass assembly and rearward of the rear glass, the lighting assembly comprising a mounting structure including a U-shaped channel that defines a slot and a PCB with a plurality of LEDs mounted thereto located within the slot, the lighting assembly oriented such that forward-angled light rays emitted by the lighting assembly will be refracted by the rear glass toward the front glass;
   a transparent rod placed adjacent to the lighting assembly and in the path of the light rays emitted by the lighting assembly; and
   a blinder which extends rearwardly from the mounting structure;
   wherein the length of the blinder and the angle of the LEDs relative to the rear glass is such that the forward-angled light emitted by the LEDs will strike the door glass assembly at an outside corner thereof to prevent a direct view of a light source of the lighting assembly through the door glass assembly when the lighting system is installed to the display case.

2. The lighting system of claim 1 wherein:
the rod contains a central axis that is substantially parallel to the at least one edge of the door glass assembly.

3. The lighting system of claim 1 wherein:
the rod is located within the U-shaped channel.

4. The lighting system of claim 1 wherein:
the mounting structure defines a front and rear ledge which sandwich two sides of the rod.

5. The lighting system of claim 1 wherein:
the rod is comprised of a material selected from the group consisting of acrylic and glass.

6. The lighting system of claim 1 further comprising:
a layer of liquid crystal material placed in between the front glass and the rear glass.

7. The lighting system of claim 1 wherein:
a central axis of each LED is positioned between 4 and 8 degrees of parallel with the front glass.

8. The lighting system of claim 1 wherein:
a central axis of the rod is substantially parallel with a central axis of the PCB having the plurality of LEDs.

9. A lighting system for a display case comprising:
a door assembly having a front glass located to front the environment in which the display case will be situated, a rear glass located rearward of the front glass and adjacent an interior space of the display case, a layer of liquid crystal material located between the front and rear glass, and at least one edge;
a mounting structure positioned along the at least one edge and having a U-shaped channel with a slot positioned near a bottom of the U-shaped channel and rearward of the rear glass;
a substrate containing a plurality of LEDs positioned within the slot, the slot oriented such that forward-angled light rays emitted by the LEDs will be refracted by the rear glass toward the front glass;
a front ledge and a rear ledge defined by the mounting structure; and
a transparent rod positioned within the U-shaped channel and contacting the front ledge, rear ledge, and the plurality of LEDs.

10. The lighting system of claim 9 wherein:
the mounting structure further includes a blinder that extends rearwardly therefrom; and
the length of the blinder and the angle of the LEDs relative to the rear glass is such that the forward-angled light from the LEDs will strike the door assembly at an outside corner thereof.

11. The lighting system of claim 10 wherein:
a central axis of the plurality of LEDs is positioned between 4 and 8 degrees of parallel with the front glass.

* * * * *